Aug. 10, 1948.    N. TRBOJEVICH    2,446,562
ANGLE MEASURING BAR AND GAUGE
Filed Feb. 26, 1945
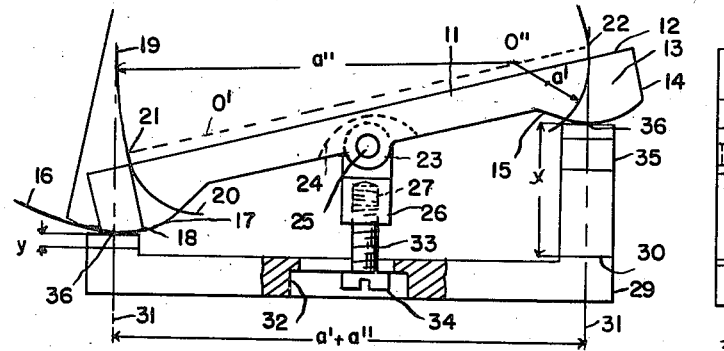
FIG.1.
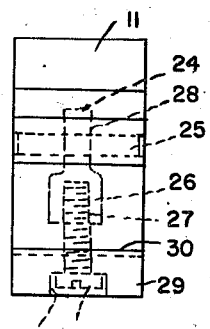
FIG.2.
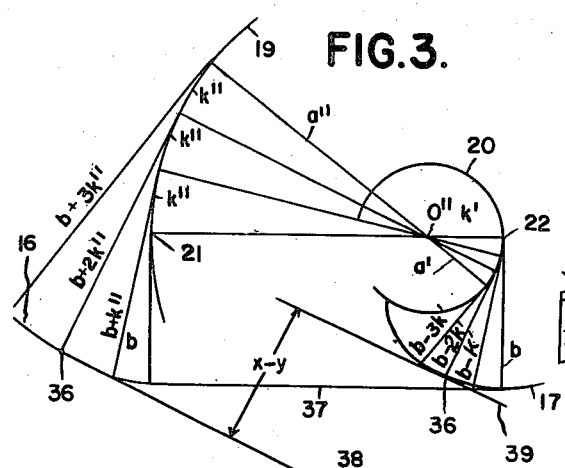
FIG.3.
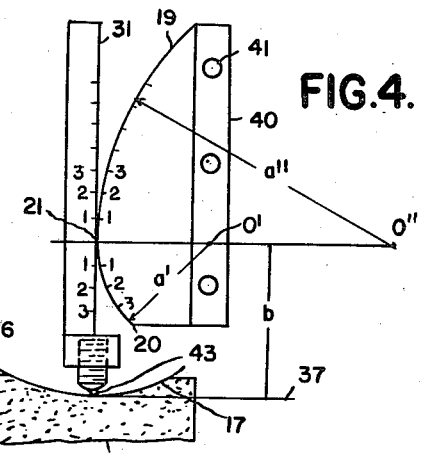
FIG.4.
FIG.5.
FIG.6.
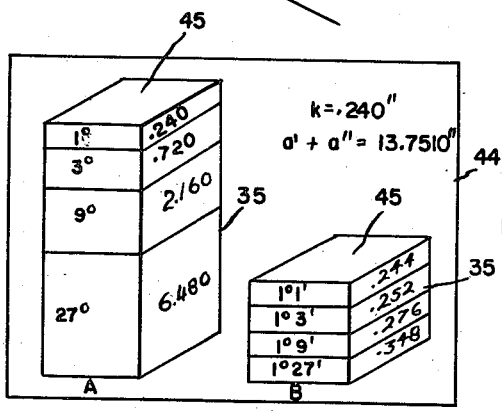
FIG.7.
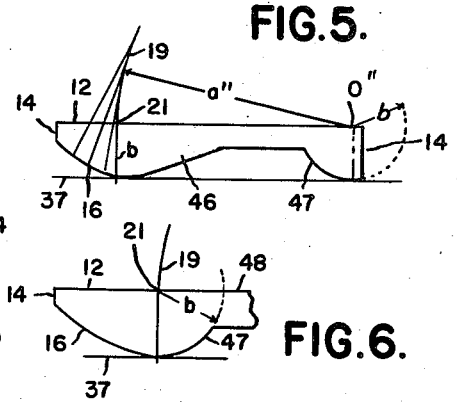
INVENTOR.
Nikola Trbojevich Patented Aug. 10, 1948

2,446,562

UNITED STATES PATENT OFFICE 2,446,562

ANGLE MEASURING BAR AND GAUGE

Nikola Trbojevich, Detroit, Mich.

Application February 26, 1945, Serial No. 579,789

7 Claims. (Cl. 33—174)

1

The invention relates to a novel angle measuring bar and a set of gauge blocks to be used in connection with the same.

In particular, the bar performs substantially the functions of a conventional sine bar with the added distinction that the height difference at the two ends of the bar is a direct measure of the angle of inclination and not of the sine of the said angle, as heretofore. This is accomplished by providing the bar with two cam-like supports of a variable radius of curvature whereby the angle to be measured is automatically rectified.

The new bar is an invention of a certain utility in itself in that it may be used as a bevel protractor or it may be operated by means of screws, gears and other constant velocity elements. However, its greatest utility comes (in my estimation) when it is combined with another invention of mine, viz: "Gauges," Serial No. 545,990, filed July 21, 1944.

In the said copending application I showed a method of constructing distances corresponding to any desired decimal fraction as a difference in height of two columns, X and Y, as I called them, assembled from the parallel sided Swedish gauging blocks in the set. Particularly, the method deals with an arithmetic resolution of any given decimal fraction into a difference of two members, each of which may be readily composed from the comparatively few available blocks. In such a manner I constructed all the decimals within a customary range by using only thirteen blocks, whereas formerly eighty-one blocks were required for that purpose.

In this invention I again employ the said differential principle, but I further refine the same for the purpose of angle measurement by adopting a base number from which the geometric series in the set are formed in relation to the base length of the bar. By this means, as it will be hereinafter explained, I am now enabled to form all degrees and minutes within a range of ±40 degrees with only eight blocks, where formerly eighty-one blocks were required. Furthermore, in my system the gauge blocks may be made considerably thicker and therefore stronger and more accurate under heavy loads.

I also discovered a new method of grinding the cam surfaces used in the new bars. The method will be illustrated and described herein, but this application refers to the bar and gauges only.

The principal object is to construct a heavy duty angle constructing bar to be used in connection with taper grinding machines, gear checking apparatus and other tools.

A secondary object is to construct a small, portable and universal angle gauge.

Another object is to manufacture even degrees and minutes in angle blocks with the greatest possible accuracy and ease, e. g. the angle blocks shown in my Patent No. 2,134,062.

A further object is to simplify the calculation and to avoid irrational numbers in assembling the various combinations.

In the drawings:

Figure 1 is the front elevation of the new bar of the portable type;

Figure 2 is a side view of Figure 1;

Figure 3 is a geometrical diagram explanatory of the theory of the bar;

Figure 4 is a diagrammatic view of the method of grinding the cam surfaces shown in Figure 1;

Figures 5 and 6 are diagrammatic views of two modifications of the bar shown in Figure 1 in which a circular arc is used in the construction of cam surfaces; and Figure 7 is a diagrammatic view of a set of gauge blocks used in connection with the new bar.

As shown in Figures 1 and 2, the new angle measuring bar 11 is provided with a measuring plane surface 12 at its top and two supporting cams 13 at its bottom portion. The said two cams are symmetrically disposed at the ends of the bar and are limited by two end planes 14 at their outer ends and by two inclined planes 15 at their inner ends. The contacting portions of the said cams 13 consist of an outer and larger involute cylinder 16 and a smaller involute cylinder 17. The said two surfaces merge one into another tangentially in the transverse axis 18 at which axis they both possess the same radius of curvature 21—18, denoted as $b$ in the calculations.

The cam curves 16 and 17, see left end of Figure 1, are generated from two base circles 19 and 20 respectively having centers at the points 0″ and 0′ and tangent to each other in the points 21 and 22 at the two ends of the bar. The line 0″—0′ is exactly parallel to the plane 12.

In the middle portion of the bar 11 a semi-circular boss 23 is integrally formed. The said boss is provided with a transverse slot 24 in its middle portion and an axial bore housing the hinge pin 25. A rocking nut 26 provided with a threaded portion 27 and a flat eyelet 28 is held in position by the said pin 25 whereby it may rock to and from in the plane of the bar but it cannot be turned around.

The bottom part of the assembly consists of an accurately finished plate 29 having two projecting plane bearing faces 30 aligned with each other in the same plane and symmetrically disposed about the vertical contact axes 31. In the middle part of the said plate 29 a T-shaped slot 32 is formed housing the inverted head 34 of the screw 33, the latter engaging the nut 26. After the preselected gauge blocks 35 have been stacked in two piles $x$ and $y$ of different heights to produce the predetermined angle of inclination of the bar 11 relative to the bottom plate 29 in the plane of the paper, the assembly is tightened up by means of the said rocking nut 26 and the screw 33. In this condition the assembly may be transported from one place to another. The complete set usually includes several screws 33 of various lengths to accommodate all possible positions of the bar 11 which, as it may be seen from Figure 1, not only rotates, but also translates corresponding to varying angles of inclination.

The theory will now be explained.

As shown in Figure 3, the base circles 19 and 20 having radii $a''$ and $a'$ have a common center $0''$ and the cooperating involute faces 16 and 17 are developed from the said circles. It is to be noted that the outwardly extending involute 16 is generated from a much larger circle 19 than the inwardly extending involute 17, that the two involutes are of opposite hands and the initial generator $b$ is of the same length as both involutes 16 and 17.

Next, I subdivide the two circles 19 and 20 into equal spacings of one degree each and denote the corresponding arc lengths with $k''$ and $k'$. If the resultant length of arc for both circles be denoted with $k$, I may write:

$$k' + k'' = k = \frac{\pi}{180}(a' + a'') \qquad (1)$$

I shall now express the lengths of generators or radii of curvature in the two involutes in the terms of $b$, $k'$ and $k''$ and form their progressive differences.

The generators at the left side of Figure 3 form an arithmetic series having ever increasing members:

$$b,\ b+k'',\ b+2k'',\ \ldots\ b+nk'' \qquad (2)$$

The generators at the right side form an ever diminishing series:

$$b,\ b-k',\ b-2k',\ \ldots\ b-nk' \qquad (3)$$

in which $n$ denotes the number of degrees to be measured.

If I rotate the initial common tangent 37 to both involutes 16 and 17 clockwise through the same angle and tangentially of the said involutes, the said tangent will split up into two parallel lines 38 and 39 and the distance between the said two lines, denoted with $x-y$, will increase proportionately with the said angle of rotation. Thus if the angle is equal to $n$ degrees, the distance $x-y$ will be equal to the difference in length of the corresponding two involute generators. Hence, from the lines (2) and (3):

$$x - y = b + nk'' - (b - nk') \qquad (4)$$

My invention is based upon the above equation.

From the Equation 4 it follows that:

$$x - y = n(k' + k'') \qquad (5)$$

and from the Equation 1 it follows that:

$$x - y = \frac{n\pi}{180}(a' + a'') \qquad (6)\ Q.\ E.\ D.$$

It is seen from the last equation that the difference in height of the two gauge block piles $x$ and $y$ (see Figure 1) is proportional to the angle to be measured $n$, and the sum of the two base radii $a'$ and $a''$. Hence, the particular values of the said radii are free to be chosen so long as their sum is kept constant. By this means I am enabled to construct the bar 11, Figure 1 to be of a minimum height, which is desirable for the sake of cost and accuracy of the bar. This is accomplished by selecting the base circle $a'$ of the inwardly facing involute 17, smaller in order to reduce the slope of the said involute and to avoid its coming too near to the said base circle.

The Equation 6 further shows that the base length $a' + a''$ must be an irrational number in order to render the value of $x-y$ rational. In particular, the said base length must be a number of the type which after being multiplied by $\pi$ becomes rational and the product so obtained is divisible by 180. In other words, the circumference of a circle formed with the said base distance as a diameter must be rational and a multiple of 180.

If I now substitute $n=1$ in the Equation 6 I shall obtain the thickness of the block $k$ corresponding to one degree angle of inclination:

$$a' + a'' = \frac{180}{\pi}k \qquad (7)$$

which leads back to the Equation 1.

The method of generating the composite cam curves 16 and 17, Figure 1 in a grinding wheel 42 is shown in Figure 4.

A templet 40 provided with a plurality of holes 41 is attached to a grinding machine in such a position that the diamond point 43 describes the curves 16 and 17 in the axial plane of the wheel 42 in a single stroke of the straight edge 31 when the said edge is rolled without sliding over the composite arc 19—21 of the said templet. The said composite arm 19—21 is formed from two circular arcs having radii $a''$ and $a'$ respectively and tangentially joining each other in the line of centers $0''$, $0'$ and the point 21. The diamond point 43 is located to be exactly aligned with the straight edge 31 and the distance from the tip of the said diamond to the point 21 is equal to $b$.

In Figures 5 and 6 two modifications of the measuring bar 11, Figure 1, are shown. These modifications arise when in the Equation 6 $a'=0$ is substituted whereby the smaller and the inwardly extending involute arc 17, Figure 3, degenerates into a circular arc 47 having a center at the point $0''$ and, preferably, a radius equal to the initial radius of curvature $b$ of the cooperating involute arc 16 situated at the other end of the bar. Thus, in Figure 5, the circular arc 47 extends inwardly of the bar 46 signifying a single acting bar similar to the one shown in Figure 3, i. e. the said bar can be tilted in only one direction.

Figure 6 shows a fragmentary view of a double acting bar 48, tiltable in both directions and employing the circular arc 47 in lieu of the said inwardly extending involute arc 17 at both ends thereof.

The modifications shown in Figures 5 and 6 are governed by the Equations 1 to 7 above deduced when the values $a'$ and $k'$ are zero. This will naturally modify the values of the remaining quantities $a''$ and $k''$.

*The differential system of gauging*

The angle measuring bar shown in Figure 1 is an instrument by means of which the gauging system herein explained may attain its maximum efficiency.

Three objects are accomplished, viz: (a) the unit of measurement is rationalized in contradistinction with the heretofore used sine method by employing a rectifying bar having an irrational length of span, (b) the gauges are placed at both ends of the bar thus increasing the number of possible combinations tremendously and (c) due to the differential method in which the difference rather than the sum of the employed blocks is a factor, the gauges may be made of a heavier cross section as already stated.

The maximum economy is obtained if the distance $k$ (see the Equation 1) is selected as a unit of progressions according to which the measuring blocks are arranged. Thus, $$k = \frac{\pi}{180}(a' + a'') \quad (8)$$

I now select the value of $k$ which is the thickness of a gauge block corresponding to one degree in the angle of inclination of the bar, as a number divisible by 60. Let $k = .240''$, then $$a' + a'' = \frac{180}{\pi} \times .240 = 13.7510'' \quad (9)$$

i. e. the bar will be about 14" long. I now form the geometric progression having a base of one degree and a multiplier or quotient of three according to the teachings of Serial No. 545,990 and my Patent No. 2,134,062 already mentioned. The angles in the series A will then be (see Figure 7):

$$1°, 3°, 9°, 27° \quad (10)$$

and the corresponding block thicknesses in inches will be:

$$.240'', .720'', 2.160'', 6.480'' \quad (11)$$

With the above four blocks, 40 combinations may be made by placing any one block: (a) in the $x$ column, (b) in the $y$ column (Figure 1), or (c) by omitting one.

In Figure 7 the required eight measuring blocks 35 are diagrammatically shown. The said blocks are of a rectangular form and their two measuring sides 45 are finished to the greatest possible accuracy both as to parallelism and thickness which is marked on each block. In addition to the thicknesses, the blocks are also marked with the angles which they represent. As it will be presently shown in this system of gauging, the assembling of the required block combinations may proceed without paying any attention to the thickness numbers as the angle may be directly computed. The eight blocks are assembled in two series of four blocks each, the A and the B series, the first referring to degrees and the second to the minutes. If finer subdivisions than one minute are required (which is seldom), further blocks may be added. The blocks are kept in a box 44 which also carries the identifying markings of the constants $k$ and $a' + a''$.

The formation of the series A was already explained and it now remains to explain the series B and to show by examples the method of calculating any desired combination of blocks.

After assuming $k = .240''$ corresponding to unit block thickness of one degree, the thickness corresponding to an angle of one minute will be only .004". This thickness is too small to be used alone and I conceived the idea of adding the distance $k$ to each block in the B series. Thus, the general form of the progression will be:

$$\frac{61}{60}k, \frac{63}{60}k, \frac{69}{60}k, \frac{87}{60}k \quad (12)$$

Or, in degrees and minutes:

$$1°1', 1°3', 1°9', 1°27' \quad (13)$$

Or, in thousandths of an inch:

$$.244, .252, .276, .348 \quad (14)$$

The expression 12 clearly shows the advantage of making the number $k$ divisible by 60 and selecting the base length of the measuring bar accordingly as by this means, any minute block will have no more than three digits.

In connection with the series 13, an additional remark must be made. The four blocks shown there are capable of producing only forty combinations, but they are sixty minutes in each degree. Instead of supplying an additional block to cover this discrepancy, I circumvent the difficulty by arithmetical means as it will be shown in the Example 2.

*Example 1.*—Construct the angle 17°37'

I first proceed with the minutes, series B.

$$37 = 27 + 9 + 1 \quad (15)$$

On the right side of the expression, all three members are positive. Hence, I have actually constructed 3°37', an excess of 3 degrees. I subtract that number from the number of degrees:

$$17 - 3 = 14 \quad (16)$$

Next, the series A will be resolved:

$$14 = 27 - 9 - 3 - 1 \quad (17)$$

The required blocks are found as the members on the right side of the Equations 15 and 17. All that is further necessary is to put the positive blocks in the $x$ column and the negative blocks in the $y$ column. The $x$ and $y$ columns are:

$$x = 1°27' + 1°9' + 1°1' + 27° = 30°37' \quad (18)$$
$$y = 9° + 3° + 1° = 13° \quad (19)$$
$$x - y = 30°37' - 13° = 17°37' \quad (20)$$

Q. E. D.

*Example 2.*—Assemble 5°55'

I first transform the angle into:

$$5°55' = 6° - 5' \quad (21)$$
$$5 = 9 - 3 - 1 \quad (22)$$
$$-5 = -9 + 3 + 1 \quad (23)$$

the correction from the Equation 23 is equal to one.

$$6 - 1 = 5 \quad (24)$$
$$5 = 9 - 3 - 1 \quad (25)$$

Hence, from the Equations 23 and 25:

$$x = 1°3' + 1°1' + 9° = 11°4' \quad (26)$$
$$y = 1°9' + 3° + 1° = 5°9' \quad (27)$$
$$x - y = 11°4' - 5°9' = 5°55' \quad (28)$$

Q. E. D.

What I claim as my invention is:

1. An angle measuring bar comprising a measuring plane and two cylindrical cams having parallel axes supporting it at its two ends, in which at least one of the cams is of an involute cross contour, in which the lines of contact of the said cams with two parallel planes are equidistant as measured in their projection upon the said planes for all angles and in which the said exact distance is a number which when multiplied by $\pi$ becomes rational.

2. An angle measuring bar comprising two parallel and transversely disposed cams having parallel axes disposed at a predetermined distance from each other, in which the cross contours of the said cams comprise two cooperating involute arcs generated from two concentric base circles in such a manner that one involute extends outwardly with ever increasing radii of curvature and the other inwardly of the bar with diminishing radii and are of opposite hands relative to each other.

3. An angle measuring bar comprising a measuring plane and two similar parallel, transversely disposed symmetrically arranged and cylindrical cams capable of contacting two parallel planes in two parallel lines at a constant projected distance from each other in various positions, in which the cross contours of said cams are composed of two involute arcs tangent to each other in points lying in a plane parallel to the said first plane.

4. In combination, a rectifying angle measuring bar having two parallel cylindrical supporting cams, one of them of an involute cross contour, at its two ends, with a plate having two plane bearing faces underneath the said cams and a plurality of parallel sided gauge blocks of various thicknesses capable of being stacked up between the said cams and the plate in two stacks in various combinations in which the distance of the lines of contact of the gauges with the cams when projected upon the said plate is a constant in which the gauge blocks are formed in two progressive series as regards to their thicknesses and in which the minimum thickness of the blocks is rational and proportional to the said distance multiplied by $\pi$.

5. An angle measuring bar comprising a measuring plane supported at its two ends by two transversely disposed cylindrical cams having cross contours comprising two involute arcs tangent to each other and extending outwardly and inwardly of the bar, in which the outwardly extending arc in one cam cooperates with the inwardly extending arc in the other cam and are generated from two concentric base circles of unequal radii.

6. An angle rectifying bar comprising a measuring plane supported at its two ends by two curved surfaces, one of which is an involute cylinder developed from a base circle and the other a circular cylinder concentric with the said base circle.

7. An angle rectifying bar comprising a measuring plane supported at its two ends by two curved surfaces, one of which comprises an involute cylinder extending outwardly of the bar with ever increasing radii of curvature and the other comprises a portion of a circular cylinder extending inwardly and having a radius corresponding to the minimum radius of curvature of the said first surface, the relationship being such that the said two surfaces possess a common tangent plane parallel to the said measuring plane.

NIKOLA TRBOJEVICH.

REFERENCES CITED

The following references are of record in the file of this patent:

UNITED STATES PATENTS

| Number | Name | Date |
| --- | --- | --- |
| 992,371 | Mather | May 16, 1911 |
| 1,268,814 | Blomstrom | June 11, 1918 |
| 1,382,717 | Duplessie | June 28, 1921 |
| 2,134,062 | Trbojevich | Oct. 25, 1938 |